United States Patent Office 2,840,564
Patented June 24, 1958

2,840,564

RUBBER ACCELERATOR

Robert C. Kinstler, Dunellen, N. J., Robert S. Barker, Port Washington, N. Y., and Gosta Brunnstrom, Somerville, N. J., assignors to American Cyanamid Company, New York, N. Y., a corporation of Maine No Drawing. Application August 1, 1956
Serial No. 601,347

9 Claims. (Cl. 260—306.5)

This invention relates to a dust free composition comprising a rubber vulcanization accelerator. More particularly, it relates to a pelletized composition comprising benzothiazolyldisulfide, and a method of preparation.

Solid rubber compounding ingredients, for instance, vulcanization accelerators such as benzothiazolyldisulfide, are generally prepared as fine powders. Finely powdered benzothiazolyldisulfide, however, when incorporated into rubber by milling leaves much to be desired. For example, it sticks and cakes on the mill rolls and is not readily dispersed in the rubber. In addition, it is extremely dusty so that the air surrounding the mill soon becomes contaminated. This results in a loss of material as well as undesirable working conditions for those required to handle the material.

These disadvantages could be greatly reduced if finely powdered benzothiazolyldisulfide could be formed into aggregates or pellets. It has been suggested that this be accomplished by agitating an aqueous suspension comprising the powder and a waxy material at a temperature above the melting point of the latter, whereby it is alleged that agglomerates of benzothiazolyldisulfide will form through the binding action of the waxy material. It has also been suggested that such pellets might be formed by compressing a mixture of benzothiazolyldisulfide, a rubber hydrocarbon and a hardening agent into a solid mass which could then be subdivided into pellets of the desired size.

Commercially acceptable pelletized benzothiazolyldisulfide must meet two requirements which appear to be conflicting. First, the particles comprising each pellet should cohere sufficiently to withstand shipment and handling without breaking down to give dusty fines. Second, when subjected to the shearing forces and mill temperatures during mastication on the rubber mill, the pellets should disintegrate to give a uniform and fine dispersion of benzothiazolyldisulfide particles throughout the rubber. The pellets should be readily "wetted" by the rubber so that they do not fall out of the rubber on the under side of an open mill roll. The pellets must not be so hard that they "pop" from the nip of an open mill roll. It is possible to make pellets soft enough to be broken by the milling shear yet hard enough to "pop" or fly from the roll nip.

It is a relatively simple matter to make pelletized benzothiazolyldisulfide. It is another matter to form pellets which disperse well in rubber. High molecular weight plastics, resins, glue, and the like will "bind" benzothiazolyldisulfide into pellets of high mechanical strength such as to satisfy the shipment and handling requirement. On incorporation into rubber, however, such pellets are broken down only to the extent of roll clearance and are not materially affected by the shear forces in the rubber. Such "binders," moreover, are neither soluble in rubber nor do they melt or soften at milling temperatures, the presence of which characteristics provide for good dispersion.

It is a principal object of this invention to provide benzothiazolyldisulfide as pellets which comply with the requirements set forth above. It is particularly an object of this invention to provide pellets of benzothiazolyldisulfide which are characterized by the quality of excellent dispersibility when incorporated into rubber. It is a further object of this invention to provide a method for producing such pellets. It is a still further object of this invention to provide such a method which is capable of consistently reproducing such an excellent dispersing pelletized product with a minimum of control and supervision.

In accordance with the present invention, these objects have been met in a surprisingly effective manner. In general, pelletized benzothiazolyldisulfide having the desired characteristics is prepared by forming an aqueous slurry comprising finely divided benzothiazolyldisulfide and a small amount of aminothiophenol. The aqueous slurry is then heated and agitated to provide intimate contact for agglomeration. After agglomerates of desired size have been formed, the slurry is cooled and resultant pellets separated.

The aqueous benzothiazolyldisulfide slurry subjected to the pelletizing process of this invention may be prepared by oxidizing an aqueous solution of sodium mercaptobenzothiazole. This latter solution may result from purification of an impure mercaptobenzothiazole melt by digesting with a deficiency of caustic thereby leaving tarry by-products and part of the mercaptobenzothiazole out of solution. Alternatively, the purification may comprise steam stripping an impure mercaptobenzothiazole melt as taught in U. S. Patent No. 2,658,864 and then digesting the resultant mercaptobenzothiazole in aqueous solution with an excess of caustic followed by a selective precipitation of mercaptobenzothiazole-free tarry impurities according to U. S. Patent No. 2,730,528.

The benzothiazolyldisulfide slurry may also be prepared by isolating the disulfide as prepared by either of the above processes and reslurrying the dry, powdered accelerator in water. Additionally, it may also be prepared by precipitating and separating free mercaptobenzothiazole from a solution of the sodium salt thereof, redissolving it in caustic and then oxidizing it to disulfide. Because the formation of pellets according to the process of this invention, unlike some processes, is not dependent on the absence or presence of impurities and/or by-products generally found in the tarry settler heels always present in most mercaptobenzothiazole purification procedures, it is immaterial how the benzothiazolyldisulfide slurry is prepared.

The density of the aqueous benzothiazolyldisulfide slurry employed in the instant process is limited principally by apparatus limitations. A slurry of which the solids content is much in excess of about 30% is too pasty and is difficult to agitate and pump in a satisfactory manner. Too concentrated slurries, moreover, tend to reduce the control of pellet size which is important. Accordingly, the solids content of the slurry should not be much in excess of 30% and usually will be from about 5–15%.

The agglomerating agent, i. e., aminothiophenol, is best employed as a solution of an alkali salt. In practice, it will usually be the sodium or potassium salt. However, other salts such as the ammonium or lithium salts may also be employed. The amount of real aminothiophenol employed may be quite widely varied. Generally, it will be the practice to use at least about 1% on the weight of the benzothiazolyldisulfide. Normally, it will be greater than this even ranging to as high as about 25%. More than about 25%, however, tends to produce a pelletized product which is soft and difficult to handle. The amount of aminothiophenol employed, therefore, will usually be less than about 25% by weight of the benzothiazolyldisulfide, generally in the range of about 5–15%.

After the slurry comprising benzothiazolyldisulfide and aminothiophenol has been prepared, it is subjected to heating. Preferably, the temperature is raised to at least about 75° C. and preferably 85–100° C. Agglomeration does not appear to progress too well much below 85° C. while there appears to be little advantage gained by operating at greater than 100° C. Agitation is conducted during the period an elevated temperature is maintained. By what means it is conducted forms no part of the invention. The more violent the agitation, however, the smaller and more uniform the size of the subsequently recovered pellets. When agglomeration has reached the desired point, the slurry is cooled and resultant pellets separated.

Why aminothiophenol should cause agglomeration and result in the formation of pellets of benzothiazolyldisulfide which are characterized by unusually excellent dispersibility where no pellets of any description are formed in its absence is not known. Nor is there any desire to limit this invention by any explanation of this action which would be at the most a mere supposition. It is clearly evident, however, that the action is not one of mechanical binding of the particles such as would apparently occur, for instance, when using waxy binders as has been suggested in the prior art.

In accordance with the above-described procedure, the pH of the aqueous benzothiazolyldisulfide mixture prior to heating is about 8–8.5. In prior art pelletizing procedures in which a waxy material is suggested as the agglomerating agent, it is claimed to be distinctly advantageous to conduct the heating and agglomerating step at a neutral or acid pH. Prior to heating, therefore, and preferably before addition of the waxy material, the pH is adjusted as by the addition of hydrochloric acid to 5–7 or even lower. In the present process, however, there is no such restriction. Because of the unusual agglomerating characteristics of aminothiophenol it is possible to conduct agglomeration at either acid or alkaline conditions.

By the process as described to this point, heating and agglomerating must be conducted for a matter of hours before excellent dispersible pellets of the desired size are obtained regardless of whether the pH is acid or alkaline. This is not wholly satisfactory inasmuch as equipment is tied up and production decreased by the prolonged agglomeration step. As an added feature and a preferred embodiment of this invention, however, it has been surprisingly discovered that the period of agglomeration can be materially reduced by a combination heating-pH adjustment step.

As already noted, the pH of the benzothiazolyldisulfide mixture is alkaline when initially prepared. According to this invention, this alkaline mixture is heated to greater than about 85° C. and preferably to boiling, and maintained there for a period of time ranging up to an hour but generally 15–30 minutes. The pH of the mixture, preferably without cooling, is then adjusted to neutral or acid as by the addition of acetic, hydrochloric, sulfuric or the like acids. The adjusted pH will usually be about 5.0–5.5 but may be as low as 4. Lower pH's, however, are not preferred because of foaming and corrosion problems. The elevated temperature is then maintained while agitating the mixture. Where agglomeration in the absence of this unique heating and pH adjustment step may require as much as six hours, similar results can now be surprisingly obtained in 1–2 hours and in many instances in as short a period as 15–30 minutes.

Although the described heating-pH adjustment step greatly reduces the agglomerating time, nevertheless, the time is not consistently reproducible, ranging from about 15 minutes to 2 hours. In accordance with this invention, however, it has been further surprisingly found that if sulfur is added to the mixture, the agglomeration at the acid pH can be consistently conducted in the unusual and heretofore unheard of time of 10–15 minutes. Why elemental sulfur should have this effect on the process is not understood, but about 3–10% on the weight of the benzothiazolyldisulfide has been found to stabilize at 10–15 minutes, an otherwise erratic agglomeration period. The use of a greater amount of sulfur does not provide for any added advantage while lesser amounts do not appear to result in consistently short agglomerating periods. The sulfur may be added at any time prior to heating at the acid pH preferably as a fine powder but will usually be added before heating on the alkaline side.

Other materials may also be added to the slurry so as to be present in the final pellets. Thus, it is highly desirable to have present in the pellets a fatty acid, such as stearic acid or a metal salt thereof, to aid in dispersion of the pellets in rubber. Fatty acids have heretofore been suggested as agglomerating agents in proposed pelletizing procedures. In the present invention, however, the presence of a fatty acid in the aqueous slurry undergoing treatment is not intended to cause agglomeration. It is added to the slurry so that it will be present in the final pellets to serve as a lubricant therefor when dispersed in rubber. The amount of real stearic acid required for lubricating purposes will range from about 5–15% but will generally be about 8–12%. Since it does not effect pelletization, it may be added at any stage of the process. As a practical matter, however, it is desirable to add it to the aqueous slurry along with the other components.

Pellet size is related to intensity of agitation. The more violent the agitation, the smaller the pellet size. The intensity of agitation should preferably be uniform so as to produce pellets of a uniform size range. Pellet size should preferably be larger than about 100 mesh since smaller pellets tend to be dusty. At the same time, the size should preferably not be greater than about 5 mesh since larger sizes tend to be difficult to disperse in rubber.

It has not been possible to definitely establish the composition of the pellets produced according to the process of this invention. A 100% composition will probably consist of 75–80% benzothiazolyldisulfide and 5–8% free mercaptobenzothiazole. Free sulfur is present in an amount of 4–5% and stearic acid 8–9%. In addition, reaction products, probably disulfides, of the agglomerating agent with benzothiazolyldisulfide appear ranging in amounts of 6–9%.

The process and pelletized composition comprising this invention are further illustrated by the following examples. All parts are by weight unless otherwise noted. Throughout the examples the following abbreviations will be used:

MBTS—benzothiazolyldisulfide
ATP—aminothiophenol

EXAMPLE 1

To a slurry comprising 25 parts of high purity MBTS in 500 parts of water is added a solution of sodium ATP containing 5 parts of ATP. This alkaline mixture at a pH of 8.5–9.0 is then heated to 80°–100° C. and agitated until pellets form. The slurry is then cooled to 65° C. by adding cold water and the pelletized product, about 10–16 mesh in size, separated by screening and dried.

EXAMPLE 2

To 200 parts of an aqueous slurry containing 100 parts of MBTS is added 7 parts real of ATP dissolved in dilute sodium hydroxide solution. The pH of the resulting mixture is adjusted to about 6.5 and the slurry heated at 98–99° C. with agitation for 5 hours. The slurry is then cooled, the product separated, washed and dried. The product comprises pellets larger than 100 mesh.

EXAMPLE 3

To a slurry of 25 parts of high purity MBTS in 515 parts of water is added 18 parts of a solution of sodium-ATP containing 2.5 parts real of ATP. The mixture is stirred and heated at the boiling point for one hour, then dilute acetic acid added to adjust the pH to 5.0–5.5. Upon continued heating at the boil for 60 additional minutes, small agglomerates form which upon cooling, filtration and drying, are found to be greater than 100 mesh in size.

EXAMPLE 4

To 2440 parts of an aqueous slurry containing 100 parts of high purity MBTS is added a mixture of 5 parts of 200 mesh sulfur dispersed in a 10% solution of sodium stearate containing 10 parts of stearic acid. While stirring the resulting mixture, 30 parts of a solution of sodium ATP containing 4 parts of ATP is added and the whole heated to boiling for 15 minutes. Dilute acetic acid is then added to bring the pH from 8.5 to 5.0–5.5. Upon additional heating at the boil and stirring for 15 minutes the slurry agglomerated into tiny pellets or beads. Cold water is then added to drop the temperature to 70° C. and the product separated by screening. The product comprises pellets of about 20 mesh in size.

EXAMPLE 5

Four samples of an aqueous MBTS slurry, each containing the components specified in Table I, are heated to the boil for 15 minutes and then adjusted to a pH of 4. Each adjusted sample is then agitated and heated at boiling for sufficient time to give pellets of a size suitable for dispersing in rubber, then cooled and the pellets separated. The times required to obtain such pellets are indicated in Table I.

*Table I*

| Sample | Component parts/100 parts MBTS | | | Agglomeration time after pH adjustment (min.) |
|---|---|---|---|---|
| | Stearic Acid | ATP | Sulfur | |
| 1 | 10 | 4 | 5 | 15 |
| 2 | 10 | 3 | 5 | 15 |
| 3 | 10 | 4 | 5 | 8 |
| 4 | 15 | 6.5 | 0 | 120 |

To illustrate the excellent dispersing property of the pellets produced according to this invention, the following example is conducted in which the pellets of this invention as well as commercially available MBTS pellets are incorporated into rubber.

EXAMPLE 6

The products listed in Table II are dispersed in natural rubber as accelerators by mixing according to a standard procedure on a two roll mill to make a master batch. After the accelerator has been incorporated into the rubber, the resultant mix is sheeted out and examined by transmitted light for the presence of particles large enough to be distinguished by the naked eye. The fewer of such particles, the better is the dispersion. Results appear in Table II.

*Table II*

| Accelerator | Incorporation Time (Min.) | Size of Agglomerates in Rubber Dispersion | Dispersion |
|---|---|---|---|
| MBTS powder | 4 | Tiny to small | fair. |
| Thiofide S (Monsanto pelletized MBTS) | 3 | A few small | good. |
| Rod form Altax (Naugatuck MBTS) | 4 | Large, med. and small | poor. |
| Example 4 | 2.2 | Very small to medium | good. |
| Sample 1 of Example 5 | 2.1 | do | good. |

Example 7 further illustrates the agglomerating action of aminothiophenol by demonstrating that pellets are not obtained in its absence.

EXAMPLE 7

To 1200 parts of an aqueous slurry containing 50 parts of MBTS is added a sodium stearate solution containing 10 parts of stearic acid. The mixture is stirred and dilute acetic acid added to reduce the pH to 5.0–5.5. It is then heated to and held at 98°–100° C. for 6 hours while stirring. There is no evidence of agglomeration of the fine particles. The slurry is quenched with cold water and filtered to yield a fine powder similar to the starting material.

Example 8 illustrates the addition of stearic acid as the lubricant after agglomeration is subsequently complete.

EXAMPLE 8

The procedure of Example 2 is repeated except that after agglomeration is complete but before cooling the slurry, 9 parts of stearic acid are added and the slurry agitated for an additional 5 minutes. The slurry is then cooled and the pellets separated. The pellets so obtained have better dispersion characteristics than those of Example 2.

We claim:

1. A method of pelletizing benzothiazolyldisulfide which comprises: agitating an aqueous slurry comprising benzothiazolyldisulfide and aminothiophenol at an elevated temperature for sufficient time to agglomerate the benzothiazolyldisulfide, and separating resultant pellets.

2. A method according to claim 1 in which the pH of the slurry is adjusted to less than about 7 prior to agitating at an elevated temperature.

3. A method according to claim 1 in which the slurry is maintained at greater than about 85° C. for a short period, the pH adjusted to less than about 7, and the elevated temperature then maintained for sufficient time to agglomerate benzothiazolyldisulfide.

4. A method according to claim 3 in which sulfur is present in the slurry.

5. A method of pelletizing benzothiazolyldisulfide which comprises: preparing an aqueous slurry comprising benzothiazolyldisulfide in finely divided form, 5–15% on the weight of the benzothiazolyldisulfide of aminothiophenol and 3–10% on the weight of the benzothiazolyldisulfide of sulfur; heating said slurry to a temperature greater than about 85° C.; subsequently adjusting the hydrogen ion concentration to an acid pH not less than about 4; agitating the slurry and maintaining the temperature thereof at greater than about 85° C. for an additional period sufficient to form agglomerates; cooling the slurry and separating pellets.

6. A method according to claim 5 in which the pH is adjusted to 5.0–5.5.

7. A method according to claim 5 in which the aminothiophenol is added to the aqueous slurry as a solution of an alkali metal salt.

8. A method according to claim 5 in which about 5–15% stearic acid is present in the aqueous slurry when subjected to heating after pH adjustment.

9. A pelletized benzothiazolyldisulfide composition prepared according to the method of claim 1.

References Cited in the file of this patent

UNITED STATES PATENTS

| 2,598,229 | Creed | May 27, 1952 |
| 2,598,319 | Throdahl | May 27, 1952 |
| 2,762,855 | Creed | Sept. 11, 1956 |

UNITED STATES PATENT OFFICE

CERTIFICATE OF CORRECTION

Patent No. 2,840,564                          June 24, 1958

Robert C. Kinstler et al.

It is hereby certified that error appears in the printed specification of the above numbered patent requiring correction and that the said Letters Patent should read as corrected below.

Column 4, line 66, for "200" read -- 2000 --; column 5, Table II, under the heading "Accelerator", lines 2 and 3 thereof, for "Thiofide S (Monsanto pelletized MBTS)" read -- Commercial MBTS as pellets --; same table, same column, lines 4 and 5 thereof, for "Rodform Altax (Naugatuck MBTS)" read -- Commercial MBTS as rods --.

Signed and sealed this 9th day of December 1958.

(SEAL)
Attest:
KARL H. AXLINE                                   ROBERT C. WATSON Attesting Officer                                Commissioner of Patent